Feb. 5, 1957 W. KOPA 2,780,110
GEAR TRANSMISSIONS
Filed Feb. 16, 1955
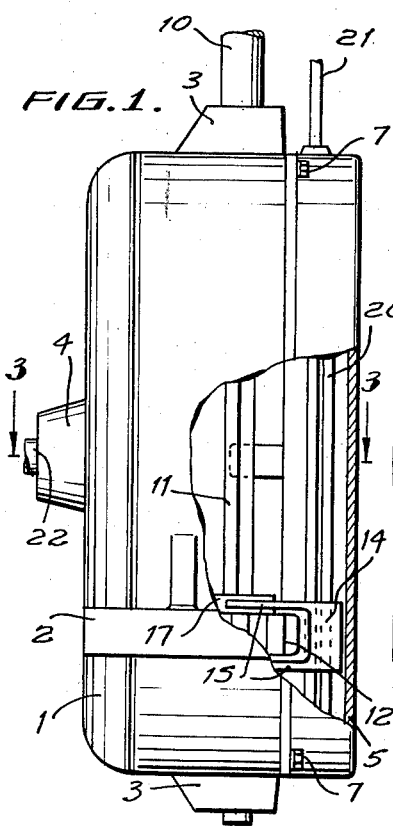
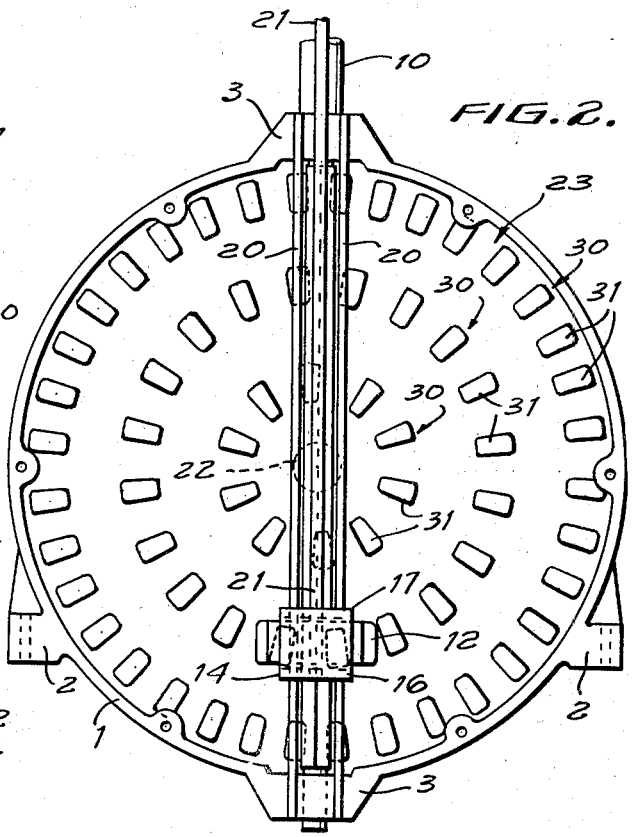
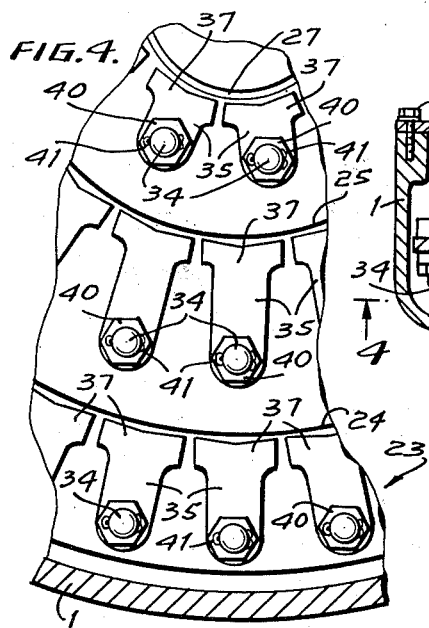
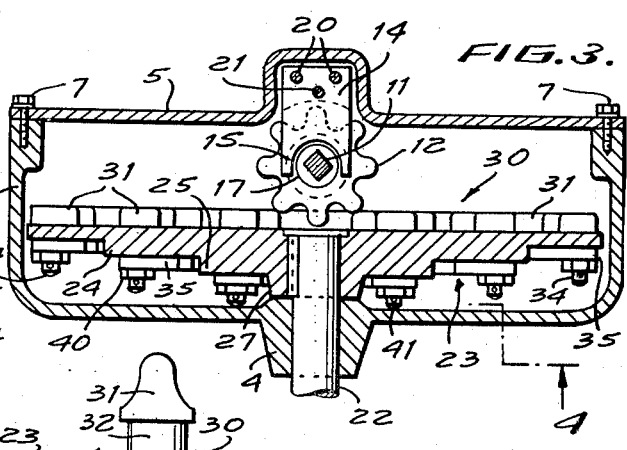
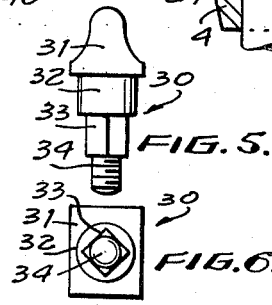
INVENTOR.
WALTER KOPA

United States Patent Office 2,780,110
Patented Feb. 5, 1957

2,780,110
GEAR TRANSMISSIONS

Walter Kopa, New York, N. Y.

Application February 16, 1955, Serial No. 488,603

1 Claim. (Cl. 74—351)

The present invention relates to power transmitting mechanisms and, more specifically, to a new transmission for automobiles, motor cycles, bicycles, agricultural implements, power tools, and many other devices where a change of the transmission ratio between a driving shaft and a driven shaft is necessary or desired.

One object of the present invention is the provision of a device of the character described which greatly facilitates and simplifies the change from one transmission ratio to another, or from a neutral position to a driving position either in advance or in reverse, to such an extent that the interposition of a friction coupling in many cases, for instance in the case of a bicycle clutch may be avoided, and which is so constructed as to greatly reduce the cost, the weight and the space requirement of the hitherto known power transmitting arrangements.

Another object of the present invention is the provision of a device of the character described which has fewer parts and is shorter than the hitherto known transmissions for automobiles or the like, so that it can be manufactured more inexpensively, is subject to less wear and tear and requires less floor space in automobiles or the like than other types of transmissions.

Still another object of the present invention is the provision of a device of the character described which is safe and reliable in operation, which has a minimum of relatively to each other revolving parts, and which is sturdy, durable and well adapted for withstanding the rough usage to which devices of this type ordinarily are subjected.

With the foregoing and other objects in view which will appear as the description proceeds, the invention consists of certain novel details of construction and combinations of parts hereinafter more fully described and pointed out in the claim, it being understood that changes may be made in the construction and arrangements of parts without departing from the spirit of the invention as claimed.

In the accompanying drawing a preferred form of the invention has been shown.

In said drawing:

Figure 1 is a side view of a preferred embodiment of my invention.

Fig. 2 is a plan view of the same as it appears after the removal of a cover member.

Fig. 3 is a sectional view on the line 3—3 of Fig. 1.

Fig. 4 is a fractional enlarged sectional view on the line 4—4 of Fig. 3.

Fig. 5 is a detailed elevation of an interdigitating member, and,

Fig. 6 is a bottom plan view of the member of Fig. 5.

Similar reference characters refer to similar parts throughout the several views.

In the drawing the numeral 1 denotes a housing which has foot portions 2 as well as bearing portions 3 and 4, and which is normally closed by means of a cover member 5 that is secured to the housing 1 by means of screw bolts 7 or the like. A driving shaft 10, which is rotatably mounted on the bearing portions 3 has—intermediate said bearing portions 3—a portion 11 which in cross-section is square as in the instance shown, or polygonal, or grooved, so that a pinion 12, which has a center bore that is shaped in accordance with the cross-sectional shape of the portion 11, can be shifted on the shaft 10 on which it is non-rotatably mounted. The pinion 12 can be shifted axially on the shaft portion 11 by any suitable means, preferably by means of a block member 14 which has bifurcated branch portions 15 (Fig. 3) that engage hub portions 17 of the pinion 12, and which is shiftably mounted on a pair of rods 20 whose ends are secured to the cover member 5 of the housing 1. A third rod 21, to which the member 14 is firmly secured, is shiftably extended through the cover member 5, so that by shifting of the rod 21 the pinion 12 will be shifted axially along the driving shaft 10.

A driven shaft 22 is rotatably mounted on the bearing portion 14, and has secured to that end which extends into the housing 1 a disk 23. The disk 23 has at one side a smooth face while its other side is provided with protruding circular portions 24, 25 and 27, which are so arranged as to increase the thickness of the disk 23 toward its center. A circular row of interdigitating members 30 encompasses each one of said circular portions 24, 25 and 27. Each interdigitating member 30 consists of a tooth portion 31, whose outer extremity preferably is rounded as may be seen in Fig. 5, and of a shaft portion which has a cylindrical section 32, a square or polygonal section 33 and a threaded section 34. The cylindrical sections 32 of the members 30 are rotatably extended through circular rows of perforations in the disk 23. Arm members 35, which have square or polygonal holes in one end, are non-rotatably secured to the sections 33 of the members 30 and are widened at their other ends 37, so as to attain T-shaped formations. The widened ends 37 are located only at a slight distance from the protruding circular portions 24, 25 and 27, so that they will hit the same when the members 30 exceed a limited angular movement relative to the disk 23. Thus the rotation of the members 23 can be limited to such a degree as is just sufficient for allowing a smooth meshing of the circumferential teeth of the pinion 12 with the tooth portions 31 of the members 30 when the pinion 12 is being shifted from one circular row of members 30 to another circular row of members 30. A nut 40 and a cotter pin 41 preferably secure each arm member 35 to a shaft portion of each member 30. I have found that this arrangement allows a smooth shifting, at low, medium and relatively high speeds. In some cases, for speeds over four thousand revolutions per minute, a spring (not shown) can be provided at each interdigitating member 30 for the purpose of bringing it quickly back to its original position after each meshing engagement with the pinion 12.

While the shaft 10 in the instance shown extends over the center of the disk 23, I have found that satisfactory results can be obtained also when the shaft 10 is extended only over a chord or a secant portion of the disk 23.

In the instance shown in Fig. 2, a shifting of the pinion 12 downwardly, so as to engage the outer row of members 30 will decrease, and a shifting upwardly, so as to engage the smallest row of members 30, will increase the speed of the driven shaft 22; a shifting of the pinion 12 into the center of the disk 23 will stop the movement of the driven shaft 22, and a shifting further upward will reverse the movement of the shaft 22.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which as a matter of language might be said to fall therebetween.

Having thus fully described my said invention, what I claim as new and desire to secure by Letters Patent is:

A gear transmission comprising a housing, a disk rotatably mounted in said housing having a plurality of circular rows of perforations as well as on one side a protruding circular portion within the orbit described by each of said circular rows of perforations, interdigitating members having shaft portions extended through said perforations and having tooth portions protruding beyond that side of said disk which is opposite the protruding circular portions thereof, an arm member firmly secured to each shaft portion of each interdigitating member having a widened end portion directed toward that protruding circular disk portion which is encompassed by the row of perforations through one of which the last-mentioned shaft portion is extended and being constructed and arranged for engaging the last-mentioned protruding circular disk portion when the interdigitating member has carried out a predetermined angular movement relative to said disk, a shaft parallel and in spaced relation to that side of said disk beyond which said tooth portions protrude, a pinion provided with circumferential teeth adapted for meshing with the tooth portions of said interdigitating members being shiftable on said shaft and non-rotatably mounted relative to the shaft, and means for shifting said pinion so that its teeth alternatingly engage interdigitating members whose shaft portions are extended through different rows of perforations in said disk.

References Cited in the file of this patent

UNITED STATES PATENTS

| 682,861 | Rittman | Sept. 17, 1901 |
| 767,866 | Busche | Aug. 16, 1904 |
| 978,877 | Grimes | Dec. 20, 1910 |
| 1,018,219 | Twombly | Feb. 20, 1912 |
| 1,036,690 | Novak | Aug. 27, 1912 |